United States Patent

[11] 3,584,137

| [72] | Inventor | Charles L. Weimer<br>Patterson Heights, Pa. |
|---|---|---|
| [21] | Appl. No. | 803,230 |
| [22] | Filed | Feb. 28, 1969 |
| [45] | Patented | June 8, 1971 |
| [73] | Assignee | Westinghouse Electric Corporation<br>Pittsburgh, Pa. |

[54] BUS DUCT COMPRISING INSULATED BUS BARS
11 Claims, 7 Drawing Figs.

[52] U.S. Cl. .................................................. 174/68,
174/99, 174/117
[51] Int. Cl. ................................................. H02g 5/06
[50] Field of Search........................................... 174/68 B,
88 B, 99 B, 117, 129 B, 132 B, 138.4, 136

[56] References Cited
UNITED STATES PATENTS

| 753,461 | 3/1904 | Anderson | 174/117(.11)UX |
| 2,376,307 | 5/1945 | Bosch | 174/117(.11) |
| 3,444,311 | 5/1969 | Weimer et al. | 174/88B |
| 3,461,222 | 8/1969 | Jorgensen | 174/117(.11) |

*Primary Examiner*—Darrell L. Clay
*Attorneys*—A. T. Stratton, Clement L. McHale and W. A. Elchik

ABSTRACT: Improved bus duct comprises a housing and insulated bus bars supported in the housing. Each insulated bus bar comprises a conducting bus bar and improved insulating-sleeve means on the bus bar.

3,584,137

BUS DUCT COMPRISING INSULATED BUS BARS

CROSS-REFERENCE TO RELATED APPLICATION

This invention is an improvement over the bus duct disclosed and claimed in the patent to Charles L. Weimer et al. entitled "Bus Duct", U.S. Pat. No. 3,444,311, issued May 13, 1969.

BACKGROUND OF THE INVENTION

1. Field of the Invention

Bus duct of the type comprising insulated bus bars.

2. Description of the Prior Art

In the above-mentioned U.S. Pat. No. 3,444,311, there is disclosed bus duct comprising a plurality of generally flat insulated bus bars supported in a housing that comprises a pair of oppositely disposed housing members that are drawn toward each other to mount the insulated bars in a compact sandwiched relationship between the housing members.

SUMMARY OF THE INVENTION

Improved bus duct comprises a housing structure and a plurality of generally flat insulated bus bars supported in the housing structure. The insulated bus bars are supported as a stacked set of insulated bus bars. The housing structure comprises a pair of oppositely disposed housing members that are drawn toward each other toward the flat outer faces of the outer insulated bus bars of the set of stacked insulated bus bars to mount the set of stacked insulated bus bars in a compact sandwiched relationship between the first pair of housing members. The housing also comprises a second pair of oppositely disposed housing members at the other opposite sides of the insulated bus bars that are secured to the first pair of housing members. Each of the insulated bus bars comprises a bare metal conducting bus bar and insulating sleeve means on the conducting bus bar. Each insulating sleeve means comprises a pair of preformed generally stiff and generally resilient insulating members that are mounted on the bus bar in a lapped relationship to insulate the bus bar. The insulating members are of a material having good thermal stability and electrical insulating qualities and also having the characteristic that the material will not adhere to itself or to the bus bar under the sustained heat and pressure of the operating conditions of the bus duct. An advantage of using this kind of material to insulate the bus bars is that the material will permit relative movement between adjacent bus bars and between the outermost bus bars and the opposite housing members without adversely affecting the insulating properties of the material and without adversely affecting the insulation of the bus duct in an operating environment. A material that has been used successfully is a polyethylene terephthalate material sold by the Dupont Company under the trademark Mylar.

DESCRIPTION OF THE PREFERRED EMBODIMENTS

Figure 1:
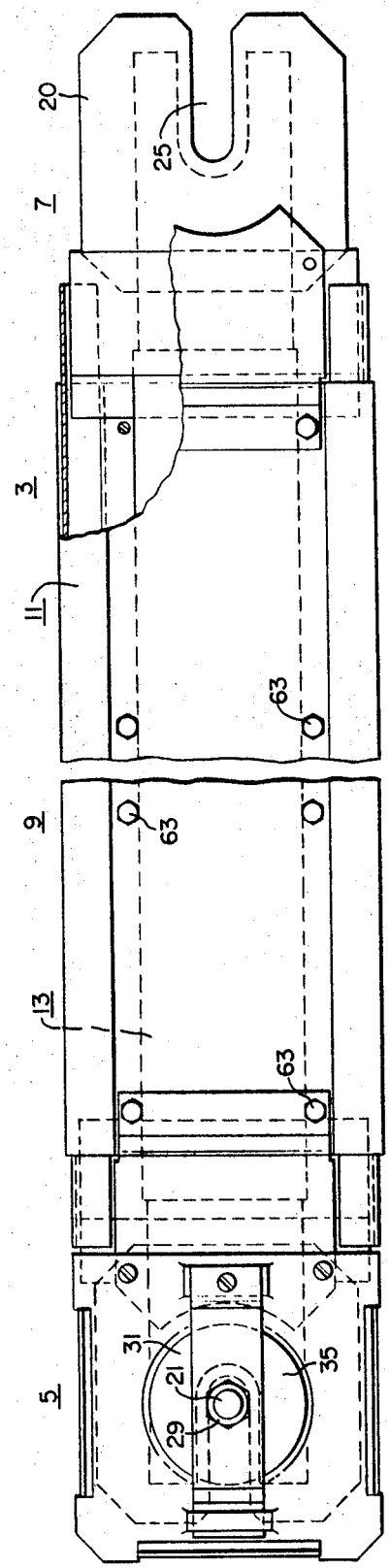
FIG. 1 is a top view, with parts broken away and with parts shown in section, of a section of a bus duct constructed in accordance with principles of this invention.
Figure 2:
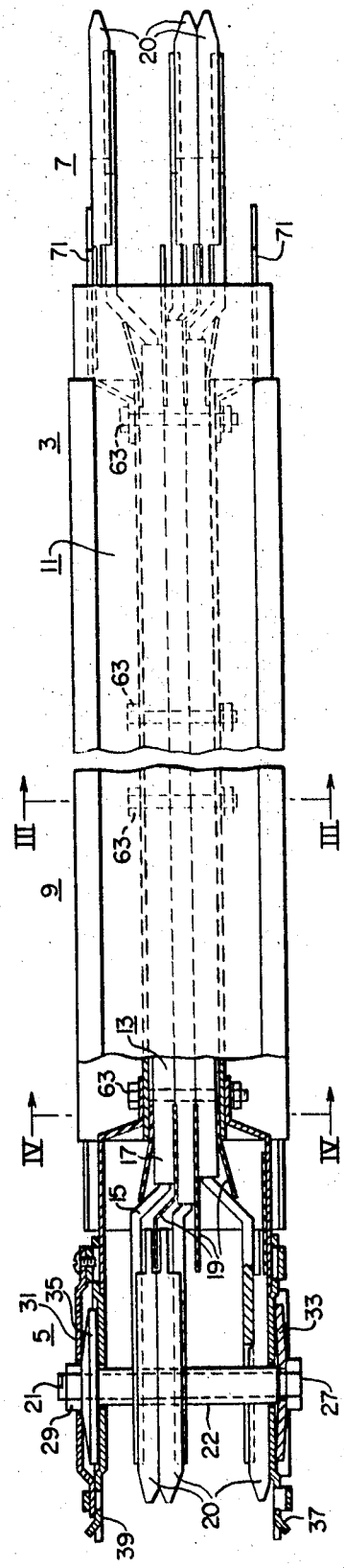
FIG. 2 is a side view, with parts broken away and with parts shown in section, of the bus duct section seen in FIG. 1.
Figure 3:
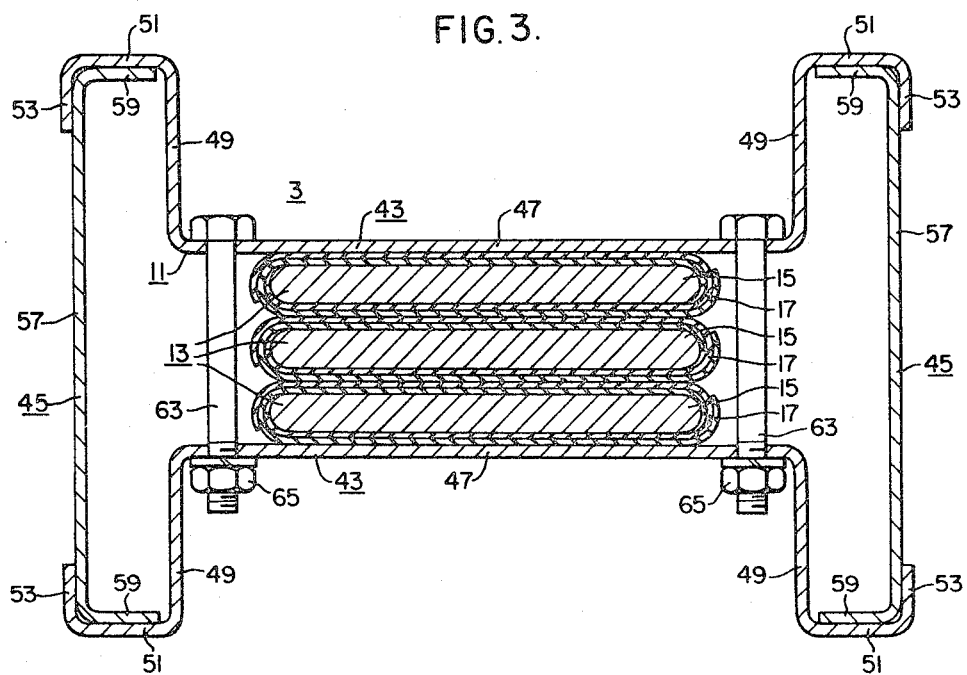
FIG. 3 is a sectional view taken along the line III–III of FIG. 2.
Figure 4:
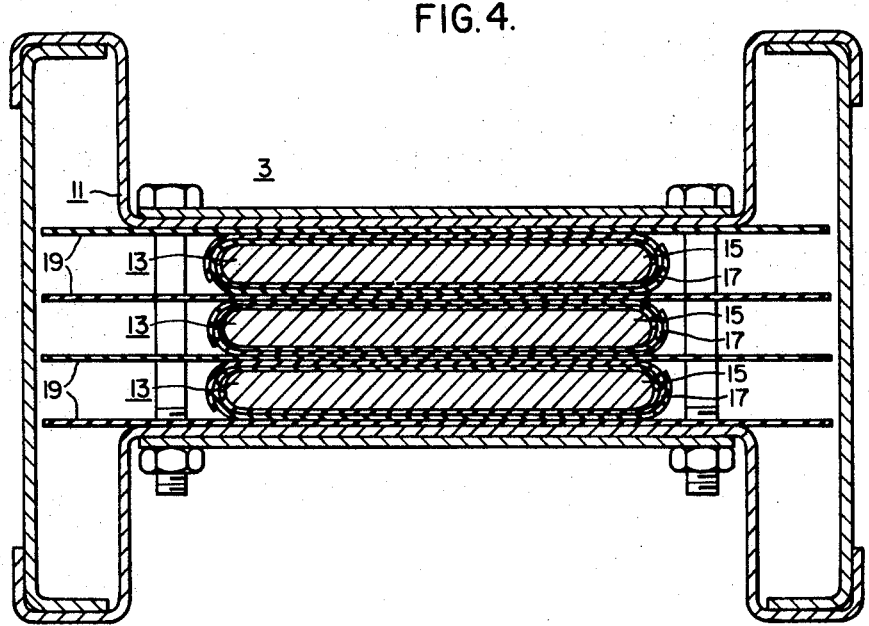
FIG. 4 is a sectional view taken along the line IV–IV of FIG. 2.
Figure 5:
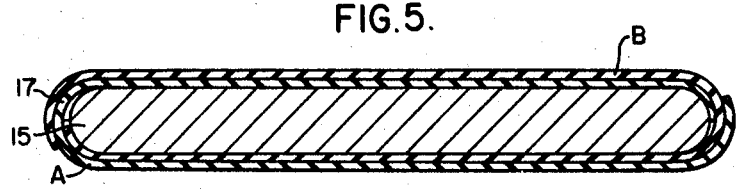
FIG. 5 is a sectional view of one of the insulated bus bars seen in FIGS. 3 and 4.

Referring to the drawings, there is shown in FIGS. 1 and 2 an elongated section 3 of the bus duct. The section 3 comprises a first connecting-end part 5 at one end thereof, a second connecting-end part 7 at the other end thereof and a main body part 9 intermediate the connecting-end parts 5 and 7. The section 3 comprises a housing structure 11 and a set of 3 insulated bus bars 13 supported in the housing structure 11. As can be seen in FIG. 2, the insulated bus bars 13 are a stacked set of insulated bus bars sandwiched together in a compact relationship at the main body part 9 of the section, and they are offset at the opposite ends 5, 7 of the section to enable connection of the section to a similar section. Each of the insulated bus bars 13 is a generally flat relatively wide and relatively thin elongated insulated bus bar. Each of the insulated bus bars 13 comprises a conducting bus bar 15 and insulating sleeve means 17 on the bus bar 15. As can be seen in FIGS. 3—5, each of the bus bars 15 is solid in cross section. Each of the bus bars 15 may be a silver-plated copper bar. The bus bars may be of other conducting material. For example, the bus bars may be silver plated aluminum bus bars or tin plated aluminum bus bars. Each of the bus bars 15 is an elongated bar that is relatively wide and relatively thin. As can be seen, for example in FIG. 6, each bus bar 15, in cross section, is formed with a pair of opposite relatively thin sides and a pair of opposite wide sides or flat faces.

As can be seen in FIG. 2, each insulating sleeve means 17 terminates short of the opposite ends of each bus bar 15 to provide uninsulated end portions to permit connection of the bus bars to bus bars of a similar section in an overlapping relationship. Four additional insulating sheets 19 (FIGS. 2 and 4) are provided at each of the ends of the section to provide increased insulation of the bus bars where the insulating sleeve means 17 terminates. As can be seen in FIG. 2, at each end there is a separate insulating member 19 between each of the outer bus bars and the associated housing, and a separated insulating member 19 between each pair of adjacent bus bars.

A plurality of rigid insulating members 20 are supported at the ends of the bus bars. A bolt 21 and insulating tube 22 extend through openings in the bus bars 15 and insulators 20 at the connecting-end part 5. The insulators 20 and bus bars 15 are provided with aligned slots 25 (FIG. 1) therein at the other connecting-end part 7 of the section. The connecting-end part 7 of one section can be moved into a connecting position cooperating with the connecting-end part 5 of a similar section with the bus bars and insulators at the connecting-end part 7 straddling the bolt 21 and insulating tube 22, and with each bus bar of one section being in a lapped relationship with a bus bar of the other section. When the sections are in the connecting position, the bolthead 27 can be rotated while a nut 29 is held against rotation by a lock member 31. This operation draws a pair of spring washers 33 and 35 toward each other to thereby draw the opposite housing parts 37 and 39 toward each other to thereby sandwich the rigid insulators 20 and bus bars 15 together to physically and electrically connect the bus bars of the section. The means for connecting the similar sections together is more specifically described in the patent to Charles L. Weimer et al. U.S. Pat. No. 3,459,872, issued Aug. 5, 1969.

The construction of the main body part 9 of the bus duct section 3 will be best understood with reference to FIG. 3. As can be seen in FIG. 3, the insulated bus bars 13 are generally flat members supported in a stacked mutually flat-wise face-to-face relationship. The housing structure 11 comprises a first pair of steel housing members 43 and a second pair of steel housing members 45. Each of the housing members 43 is a generally U-shaped structure comprising a planar bight part 47 and a pair of flat planar opposite main leg parts 49 extending from the bight part 47 generally normal to the plane of the bight part 47. Each of the main leg parts 49 is bent over near the upper end thereof to form a flat planar outer leg part 51 extending outwardly from the associated part 49, and the parts 51 are bent over to provide downwardly extending end parts 53 that extend downwardly parallel to main leg parts 49. As can be seen in FIG. 3, each of the housing members 43 is an integral sheet metal member bent over to form the parts 47, 49, 51 and 53.

Each of the housing members 45 of the second pair of opposite housing members, at the main body part 9 of the bus duct section, is a generally C-shaped sheet metal member. Each of the members 45 comprises a flat planar bight part 57 bent over at the opposite ends thereof to provide flat planar main leg parts 59 extending normal to the plane of the bight part 57. The main leg parts 59 engage the outer leg parts 51 of the members 43 as shown in FIG. 3. The parts 59 of the members 45 can be secured to the parts 51 of the members 43 by welding, bolts, or other securing means.

A plurality of pairs of bolt members 63 are passed through suitable openings in the opposite housing members 43, and nut members 65 are tightened on to the bolt members 63 to draw the housing members 43 toward each other to tightly sandwich the stacked set of insulated bus bars 13 between the bight portions 47 of the members 43 in a compact relationship. With the bight portions 47 of the housing members 43 drawn against the insulated bus bars 13, heat is conducted through the bus bars 15 and insulating sleeve means 17 to the housing members 43. The surfaces of the members 43 provide large surface areas for the dissipation of heat into the surrounding air. The members 43 close off two opposite sides of the set of bus bars 13, and the members 45 close off the other two opposite sides to completely enclose the insulated bus bars 13 at the main body part 9 of the bus duct section.

As can be seen in FIGS. 1 and 2, a pair of housing members 37, 39 are suitably secured to the main body part 9 of the bus duct section by means of two bolts 63. The housing members 37, 39 are provided at the connecting-end part 5, and additional housing members 71 are secured to the main body part 9 of the bus duct section by means of two bolts 63 at the connecting-end part 7. The housing parts 37, 39 and 71 cooperate with other housing parts to enclose the offset bus bars at the connections in a manner more specifically described in the above-mentioned patent of Charles L. Weimer et al. Pat. No. 3,459,872.

Figure 6:
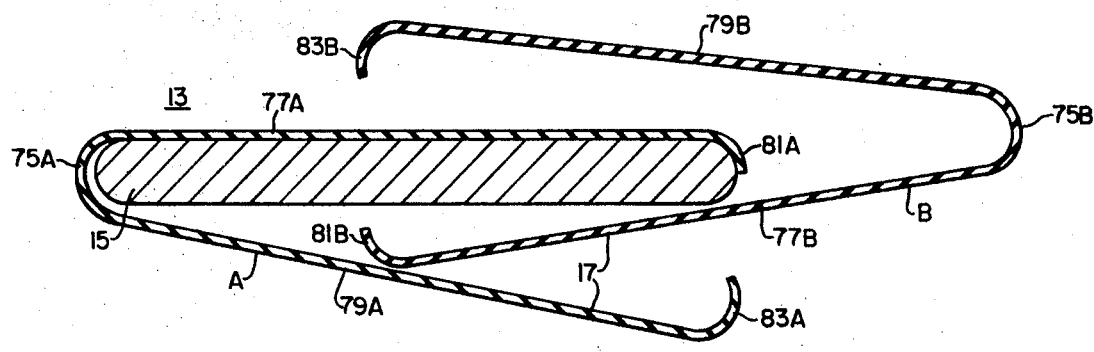
FIG. 6 is a view similar to FIG. 5 illustrating how the cooperating insulating members are mounted on the conducting Bus bar.

As will be best understood with reference to FIGS. 5 and 6, each of the insulating sleeve means 17 comprises two insulating members A and B. Each of the insulating members A and B is a preformed generally stiff and generally resilient member. Each of the insulating members A and B is of a material having the characteristic that it will not adhere either to itself, to the metal bus bar or to the metal housing under the sustained heat and pressure that the insulating material is subjected to in an operating bus duct environment. The material has the characteristic that it can slide against itself, the associated metal bus bar and the metal housing under the sustained heat and pressure of an operating bus duct environment. For example, the material should have the characteristic that it will not adhere to itself or to the bus bars or to the housing under a sustained pressure of 1,275 pounds per sq. inch at the main body part 9 of the bus duct when the bolts 63 and nut 65 are tightened to draw the insulated bus bars into the compact sandwiched relationship seen in FIG. 4, and under sustained temperatures of up to 150° C. when the bus duct is in an operating environment. Other materials which are suitable for use as insulating members A and B are: polytetrafluoroethylene, polycarbonate, polysulfone, polyimide and polyamide-imide.

In the embodiment disclosed in FIGS. 5 and 6, each of the insulating members A and B has a thickness of 10 mils. and the bus bar is used in an application where a total complete covering of 20 mils. thickness is required on each bus bar. As can be seen in FIG. 6, each of the insulating members A and B is a generally U-shaped member comprising a bight part 75, a first side leg 77, a second side leg 79, a first end leg 81 and a second end leg 83. Each of the members A and B is formed as a unitary member preformed to provide the side legs and end legs. As can be understood with reference to FIG. 6, the same reference characters are applied to the members A and B except that the reference characters of the insulating member A have an "A" suffix and the reference characters of the insulating member B have a "B" suffix. Referring to FIG. 6, it will be understood that the insulating member A is moved into position from the left side (FIG. 6) with the bight portion 75A on the left, and the insulating member B is moved into position from the right side with the bight portion 75B on the right. The members A and B are moved toward the bus bar until they snap or move into the position seen in FIG. 5. As will be understood with reference to FIGS. 5 and 6, the end leg 81B moves between the left side of the bus bar and the bight portion 75A; the end leg 81A moves between the right side of the bus bar and the bight portion 75B; the first side leg 77A moves against the upper wide side of the the bus bar; the first side leg 77B moves against the lower wide side of the bus bar; the bight portion 75A covers the end part 81B; the bight portion 75B covers the end part 81A; the second side leg 79A covers the first side leg 77B; the end part 83A extends around part of the bight part 75B; the side leg 79B covers the side leg 77A; and the end part 83B extends around part of the bight part 75A. The insulating sleeve means 17 is shown in FIG. 5 in the position mounted on the bus bar. As can be seen in FIG. 5, it is noted that the end part 83B and end part 81B overlap, with the bight portion 75A in between, to provide that there is at least a double thickness of the insulation; at the left side of the bus bar and the end parts 81A, 83A overlap at the right side, with the bight portion 75B therebetween, to provide that there is at least a double thickness of the insulation at the right side of bus bus bar The snap-on type insulators A and B are retained in place during the assembly by their own general resiliency and general stiffness, and when the three insulated bus bars are mounted and compacted between the opposite housing parts 43 (FIG. 3) by means of the bolt 63 and 65, the insulation is firmly held in place by the pressure of the assembly. As can be understood with reference to FIG. 5, with each of the insulating members A and B having a thickness of 10 mills, and with the parts formed and assembled as shown, there is at least a 20 mil. thickness over any point on each bus bar at the main-body part 9 of the section.

Under operating conditions, the bus bars and housing moved relative to each other under expansion and contraction conditions and during overloads or short circuits when the magnetic forces tend to repel the bus bars from each other. With the insulating sleeve means 17 having the characteristic that it will not adhere to itself or to the bus bar or to the housing under the sustained heat and pressure in an operating environment, it can be understood that it is less likely that the relative movement between these members will cause a rupture of the insulation. With the members having a general stiffness to retain their form and a general resilience to permit the above-described mounting operation, the bus duct can be easily and efficiently assembled.

A section of bus duct like that disclosed in FIGS. 1—4 was successfully tested with each of the insulating members A and B being a member of Mylar having a thickness of 10 mils. The bolts 63 were tightened to provide a clamping pressure of 1,275 pounds per square inch on the Mylar. The section was connected in a circuit to carry current, and a thermocouple was applied to one of the bus bars. The heat at the bus bar was recorded as 150° C., and this condition was maintained for one week. The test had no adverse effect on the Mylar insulating members. The Mylar insulating members did not adhere either to each other, to the bus bars or to the housing members, and the Mylar insulating members, which were in excellent condition, were readily removed at the completion of the test.

Figure 7:
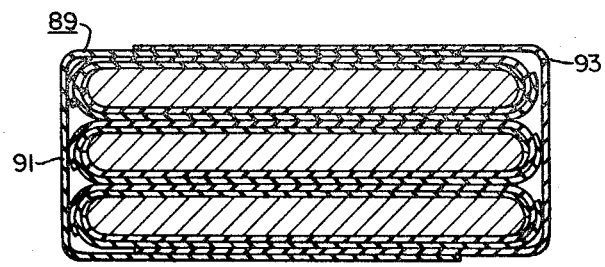
FIG. 7 is a sectional view similar to FIG. 3, with the housing structure broken away, illustrating another embodiment of the invention.

Another embodiment of the invention is shown in FIG. 7. In this FIG., the housing (FIG. 3) has been left off for the purpose of clarity, and the three insulated bus bars are identical to those described with reference to FIGS. 1—6. Members 91 and 93 are insulating members of the same material as the members A and B hereinbefore described with the members 91 and 93 being U-shaped and moved into position as shown to provide an outer insulating sleeve 89 around the set of insulated bus bars. The bus bars, with the outer sleeve 89 thereon, are mounted within the housing 11 in the same manner as is shown in FIGS. 1—4. The extra outer insulating sleeve 89 serves as additional insulation and also provides an additional cover to prevent moisture from getting into the inner area of the insulating sleeve 89.

I claim:

1. A section of bus duct comprising a housing, a set of a plurality of generally flat insulated bus bars supported in said housing, said section comprising a main body part intermediate the ends thereof, said insulated bus bars of said set at said main body part of said section being positioned in a stacked mutually flatwise face-to-face relationship, each of said insulated bus bars at said main body part comprising a conducting bus bar and insulating sleeve means on the bus bar, each of said insulating sleeve means being of an insulating material having the characteristic that it will not adhere to the associated metallic conductor and that it will not adhere to the adjacent insulating sleeve means under the sustained heat and pressure of the bus duct during operating conditions, said housing at said main body part comprising a main body part housing construction, said main body part housing construction comprising a first pair of oppositely disposed housing members, securing means drawing said first pair of oppositely disposed housing members toward each other toward the flat outer faces of the outer insulated bus bars of said set of stacked insulated bus bars to thereby mount said set of insulated bus bars in a compact sandwiched relationship between said first pair of housing members, each of said bus bars being a generally flat bus bar and comprising a pair of opposite large-area sides and a pair of opposite small-area sides, each of said insulating sleeve means comprising a pair of generally U-shaped insulating members with each of said generally U-shaped insulating members comprising a bight part a first leg and a second leg, on each of said bus bars:

a first of the insulating members being positioned with the bight part thereof at a first small-area side of the bus bar and with a first leg thereof covering a first widearea side of the bus bar, the second of the insulating members being positioned with the bight part thereof adjacent the second small-area side of the bus bar and with the first leg thereof covering the second large-area side of the bus bar, the second leg of the first insulating member being positioned over the first leg of the second insulating member and the second leg of the second insulating member being positioned over the first leg of the first insulating member.

2. A section of bus duct according to claim 1, each of said generally U-shaped insulating members comprising a first end part bent over at the free end of the first leg thereof and a second end part bent over at the free end of the second leg thereof, on each of said bus bars:

the first end part of the first insulating member being positioned between the second small-area side of the bus bar and the bight part of the second insulating member, the first end part of the second insulating member being positioned between the first small-area side of the bus bar and the bight part of the first insulating member, the second end part of the first insulating member being positioned on the outside of the bight part of the second insulating member and the second end part of the second insulating member being positioned on the outside of the bight part of the first insulating member.

3. A section of bus duct according to claim 2, said end parts of said first and second insulating members being of such a length that at each of the first and second small-area sides of each of said bus bars the two end parts of one of the insulating members overlap each other, with the bight part of the other insulating member being in between the overlapped end parts to thereby provide that there is at least a double thickness of insulation completely around each bus bar.

4. A section of bus duct according to claim 3, and each of said insulating members being of a generally stiff material to retain its form and having sufficient resiliency that the member can be moved into the mounted position on the associated bus bar from a small-area side of the associated bus bar.

5. An insulated bus bar comprising an elongated conducting bus bar and elongated insulating sleeve means on said bus bar, said bus bar being generally flat and comprising a pair of opposite relatively large area sides and a pair of opposite relatively small area sides, said insulating sleeve means comprising a pair of insulating members, a first of said insulating members comprising a first bight part, a first leg extending from said first bight part and a second leg extending from said first bight part generally parallel to said first leg, the second of said insulating members comprising a second bight part, a third leg extending from said second bight part and a fourth leg extending from said second bight part generally parallel to said third leg, said pair of insulating members being positioned on said bus bar to provide said insulating sleeve means, said first bight part being disposed at a first of said small area sides, said second bight part being disposed at the second of said small area sides, said first leg being positioned adjacent a first of said large area sides between said first large area side and said fourth leg, said third leg being positioned adjacent the second of said large area sides between said second large area side and said second leg, whereby said pair of insulating members cooperate in a lapped relationship to form said insulating sleeve means on said bus bar.

6. An insulated bus bar according to claim 5, said first leg of said first insulating member being bent over at the free end thereof to provide a first end part, said second leg of said first insulating member being bent over at the free end thereof to provide a second end part, said third leg of said second insulating member being bent over at the free end thereof to provide a third end part and said fourth leg of said insulating member being bent over at the free end thereof to provide a fourth end part, said first end part being disposed at said second small area side between said second small area side and said second bight part, said second end part being disposed at said second small area side on the outside of said second bight part, said third end part being disposed at said first small area side between said first small area side and said first bight part, and said fourth end part being disposed at said first small surface area side on the outside of said first bight part.

7. An insulated bus bar according to claim 6, said first end part and said second end part at said second small area side overlapping each other with said second bight part being in-between said overlapped first and second end parts, said third end part and said fourth end part at said first small area side overlapping each other with said first bight part being in-between said overlapped third and fourth end parts, whereby there is at least a double thickness of said insulating members around the periphery of said bus bar.

8. A section of bus duct comprising a housing, a set of a plurality of generally flat insulated bus bars supported in said housing, each of said insulated bus bars being an insulated bus bar according to claim 7, said section comprising a main body part intermediate the ends thereof, said insulated bus bars of said set at said main body part of said section being positioned in a stacked mutually flatwise face-to-face relationship, said housing at said main body part comprising a main body part housing construction, said main body part housing construction comprising a first pair of oppositely disposed housing members, securing means drawing said first pair of oppositely disposed housing members toward each other toward the outer large area sides of the outer of said insulated bus bars to mount said set of stacked insulated bus bars in a compact sandwiched relationship between said first pair of housing members.

9. A section of bus duct according to claim 8, each of said insulating members being an insulating sheet-material insulating member having a thickness of between 8 mills. and 12 mils., and each of said insulating members being a member of polyethylene terephthalate material.

10. An insulated bus bar according to claim 5, and each of said insulating members being a sheet material insulating member of a material selected from the class consisting of polyethylene terephthalate, polytetrafluoroethylene, polycarbonate, polysulfone, polyimide and polyamide-imide.

11. A section of bus duct comprising a housing, a set of a plurality of generally flat insulated bus bars supported in said housing, each of said insulated bus bars being an insulated bus bar according to claim 5, said section comprising a main body part intermediate the ends thereof, said insulated bus bars of said set at said main body part of said section being positioned in a stacked mutually flatwise face-to-face relationship, said housing at said main body part comprising a main body part housing construction, said main body part housing construction comprising a first pair of oppositely disposed housing members, securing means drawing said first pair of oppositely disposed housing members toward each other toward the outer large area sides of the outer of said set of stacked insulated bus bars to mount said set of stacked insulated bus bars in a compact sandwiched relationship between said first pair of housing members.